June 9, 1959 H. R. CZAPSKI 2,889,644

MICRO PHOTO VIEWER

Filed Jan. 15, 1957

Inventor
HERMANN REINHARDT CZAPSKI

BY Robert H. Jacob
AGENT 2,889,644
Patented June 9, 1959

2,889,644

MICRO PHOTO VIEWER

Hermann Reinhardt Czapski, Dusseldorf, Germany

Application January 15, 1957, Serial No. 634,193
3 Claims. (Cl. 40—70)

The invention relates to microphoto viewers formed to simulate television sets. Microphoto viewers the casings of which have the form and appearance of a miniature radio or television set are known. Known microphoto viewers of this kind are provided with an eyepiece and an adjustable photo carrying disc movable by means of a ratchet the edge of which disc penetrates through a slot arranged in the casing for turning.

Slots in the casing of the photo viewer are disadvantageous as they allow the entry of dust and undesired light inside the casing. In addition known microphoto viewers require to be operated with two hands, that is, one hand holds the apparatus whilst the other effects the photo movement.

To obviate these disadvantages according to the invention a divided viewer casing is used which consists of two box halves fitting into one another which when pressed together against a spring, effect the further movement of the photo carrier.

For this purpose the lower half of the box has two freely projecting flat springs of different lengths and the rotatable photo carrier carries control cams co-axially with its bearing pin and arranged corresponding to the number of photos thereon, the flat springs and control cams are in such working connection that on pressing together the box-like parts the long flat spring strikes against a control cam and turns the photo carrier by one photo width whilst the short flat spring blocks the opposite control cam displaced by 180° on the photo carrier to limit the movement by a photo width.

A further feature of the invention consists in the fact that the wall of the upper half of the box on which the photo carrier disc is mounted, is detachable or hinged or fixed to the upper half of the box by means of hinges. With a viewing apparatus so constructed the photo carrier disc can easily be exchanged and replaced with different photo sequences.

Embodiments of the invention are illustrated in the drawings in which.

Figure 4:
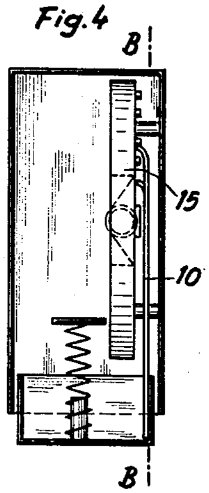
Fig. 4 shows a longitudinal section through a microphoto viewer the photo carrier of which comprises a spool for turning on an endless strip of photos.
Figure 5:
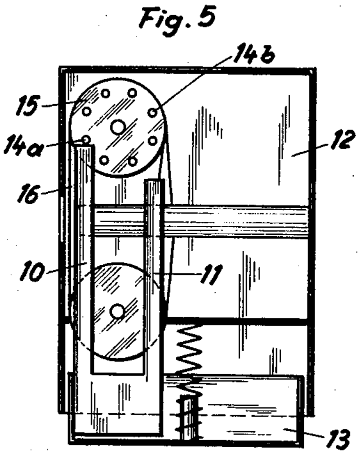

Fig. 5 a section on line B—B of Fig. 4.

Figure 6:
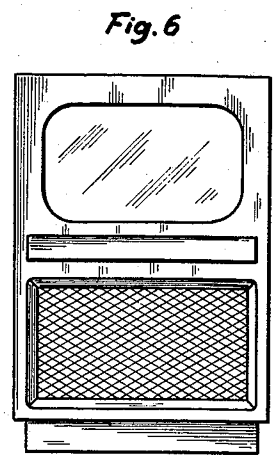

Fig. 6 a front view of the compressible microphoto viewer and

Figure 7:
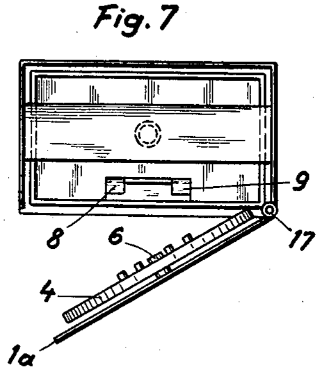

Fig. 7 shows the cross section of a microphoto viewer in which the wall of the upper half of the box taking the photo carrier disc is hinged open for changing of the photo carrier.

Figure 1:
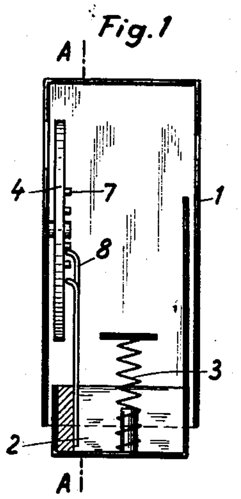
Fig. 1 shows a longitudinal section through a microphoto viewer with rotatable photo disc and comprising two box halves.
Figure 2:
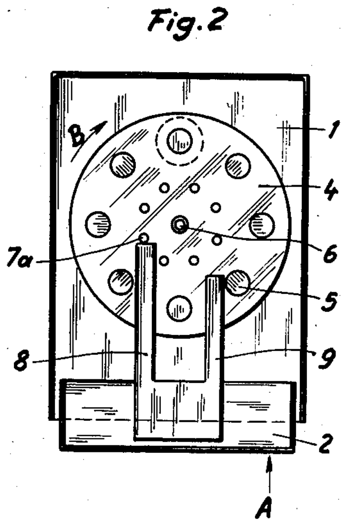
Fig. 2 shows a section on line A—A of Fig. 1.
Figure 3:
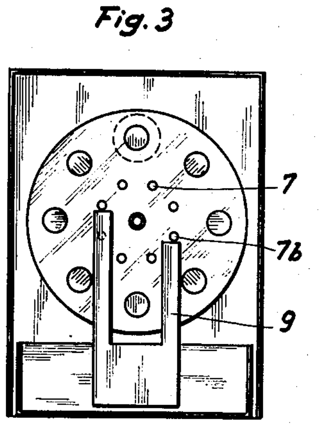
Fig. 3 is the view as in Fig. 2 but with the box halves pressed together.

The microphoto viewer consists of the two halves of a box 1 and 2 which are capable of being pressed together against a spring 3. In the construction according to Figs. 1–3 a disc 4 with the photos 5 serves as a photo carrier. Concentric to the bearing pin 6 of the photo disc are arranged the control cams 7. Flat springs 8 and 9 with their ends bent towards the photo disc are fixed on the half of the box 2. On pressing together the halves of the box in the direction of the arrow A the end of the flat spring 8 first contacts the control cam *7a* and rotates the photo disc in the direction of the arrow B by the width of one photo until at the end of the stroke the flat spring 9 reaches and blocks the control cam *7b*. In the construction according to Figs. 4 and 5 the flat springs 10 and 11 on pressing together the halves of the boxes 12 and 13 control the cams 14*a* and 14*b* of the photo spool 15 in a similar manner whereby the photo strip 16 is moved by one photo length. The photo carrier disc is mounted on the pivot pin 6 provided on wall 1*a* which is linked to the upper box half 1 by means of a hinge 17 which permits wall 1*a* to be opened to change the photo carrier disc. The disc can be withdrawn from the pivot pin 6 and a new disc can be inserted.

We claim:

1. A microphoto viewer comprising a housing having an eye-piece and including telescoping first and second casings, a disk carrying pictures in spaced relation to each other, mounted in said first casing for rotation through an angle corresponding to the distance between the pictures, a plurality of abutment members arranged in a circle and projecting from the surface of said disks at a distance from each other corresponding to the spacing between said pictures, operating means including a pair of resilient legs mounted in said second casing, one disposed on each side of a center line drawn through said disk parallel to said legs and extending toward said abutment members, one of said legs being shorter than the other by an amount corresponding substantially to the distance between said abutments and said legs being movable with said second casing one each into engagement with one of two diametrically opposite abutments to rotate and lock said disks in position.

2. A microphoto viewer comprising a housing having an eye-piece and including telescoping first and second casings, a disk carrying pictures in spaced relation to each other, mounted in said first casing for rotation through an angle corresponding to the distance between the pictures, a plurality of abutment members arranged in a circle and projecting from the surface of said disks at a distance from each other corresponding to the spacing between said pictures, operating means including a pair of resilient legs mounted in said second casing, one disposed on each side of a center line drawn through said disk parallel to said legs and extending toward said abutment members, one of said legs being shorter than the other by an amount corresponding substantially to the distance between said abutments, said legs being movable with said second casing one each into engagement with one of two diametrically opposite abutments to rotate and lock said disks in position, and said legs being bent toward said disk to provide for engagement with said abutments.

3. A microphoto viewer comprising a housing having an eye-piece and including telescoping first and second casings, a disk carrying pictures in spaced relation to each other, mounted in said first casing for rotation through an angle corresponding to the distance between the pictures, a plurality of abutment members arranged in a circle and projecting from the surface of said disks at a distance from each other corresponding to the spacing between said pictures, operating means including a pair of resilient legs mounted in said second casing, one disposed on each side of a center line drawn through said disk parallel to said legs and extending toward said abutment members, one of said legs being shorter than the other by an amount corresponding substantially to the distance between said abutments, said legs being movable with said second casing one each into engagement with one of two diametrically opposite abutments to rotate and lock said disks in position, said first and second casing being spring biased toward one another.

References Cited in the file of this patent

UNITED STATES PATENTS

| | | |
|---|---|---|
| 1,219,933 | Gillespie | Mar. 20, 1917 |
| 2,377,021 | McClure | May 29, 1945 |
| 2,385,183 | Avers | Sept. 18, 1945 |
| 2,706,429 | Frankel et al. | Apr. 19, 1955 |
| 2,764,911 | Smith | Oct. 2, 1956 |